United States Patent
Myers

(10) Patent No.: US 6,570,562 B1
(45) Date of Patent: May 27, 2003

(54) METHOD FOR DRAWING PATTERNED LINES IN A SYSTEM SUPPORTING OFF-SCREEN GRAPHICS

(75) Inventor: Dan Myers, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/563,827

(22) Filed: May 3, 2000

(51) Int. Cl.[7] .......................... G06F 13/00; G06T 15/00
(52) U.S. Cl. ........................ 345/418; 345/420; 345/686; 345/530; 345/443; 345/549; 382/202; 382/260
(58) Field of Search ................... 345/418–419, 345/420–422, 426–428, 581–583, 586–589, 592–593, 596–597, 600, 605, 611–612, 615–618, 619, 642, 686, 441, 442–443, 467–469, 470–471, 475, 501, 530, 531, 538–539, 543, 544, 545, 547, 548, 549; 382/193, 194, 202–204, 208, 258, 260–268

(56) References Cited

U.S. PATENT DOCUMENTS

| | | | | |
|---|---|---|---|---|
| 4,075,695 A | * | 2/1978 | Lelke | 340/172.5 |
| 5,005,011 A | * | 4/1991 | Perlman et al. | 340/728 |
| 5,444,825 A | * | 8/1995 | Bain et al. | 345/443 |
| 6,037,951 A | * | 3/2000 | Albers et al. | 345/443 |
| 6,052,480 A | * | 4/2000 | Yabuki et al. | 382/178 |
| 6,100,903 A | * | 8/2000 | Goettsche | 345/443 |
| 6,304,274 B1 | * | 10/2001 | Brokenshire | 345/443 |

FOREIGN PATENT DOCUMENTS

| | | | | |
|---|---|---|---|---|
| JP | 61075428 | * | 4/1986 | G06F/3/14 |
| JP | 02035578 A | * | 2/1990 | G06F/15/72 |
| JP | 02222079 A | * | 9/1990 | G06F/15/72 |

* cited by examiner

Primary Examiner—Matthew C. Bella
Assistant Examiner—Wesner Sajous

(57) ABSTRACT

A method for rendering patterned lines in an environment that need not support rendering of patterned lines through a standard viewing mechanism, but that does support the rendering of graphical primitives in an off-screen imaging area. A solid line is rendered in the off-screen imaging area that has been filled with a background color by turning the pixels corresponding to the solid line from the background color to a line color. A pattern is next applied to the solid line to render a patterned line by use of a filtering mechanism that filters out pixels that correspond to off-segments of the pattern. The patterned line is next transferred from the off-screen imaging area to a viewing device where it is displayed.

16 Claims, 2 Drawing Sheets

METHOD FOR DRAWING PATTERNED LINES IN A SYSTEM SUPPORTING OFF-SCREEN GRAPHICS

FIELD OF THE INVENTION

The present invention relates generally to computer applications with high-performance graphics capabilities, and to subassemblies and methods for use in such applications.

BACKGROUND OF THE INVENTION

Many software applications include built-in "rendering" or "drawing" programs to build images of graphics primitives, such as lines, circles, etc., for display. The graphics primitives are laid out or rendered in a buffer memory prior to being displayed. Building an image by such rendering programs may occur by allocating a partition in the main memory address space as the buffer for rendering a graphic image. Data between the main memory and the buffer is exchanged as required by the demands of rendering. The buffer may be an on-screen video memory that displays the graphic while it is being built, an off-screen video memory partition or imaging area that will be swapped into the on-screen video memory partition when it is time to display the graphic primitive, or an address space serving as either an on-screen memory or an off-screen memory. An off-screen memory imaging area is a partition of memory that is capable of rendering graphics primitives without displaying them on a viewable device; it is an area of memory that can be addressed as if it were a graphics device.

A particular interest to the present application is the rendering of lines. Straight, solid lines may be rendered through the so-called "brute-force approach" or the "primitive line-drawing method," of which Bresenham's algorithm is an example. The brute-force approach is a straightforward way to compute a pixel-by-pixel representation of a straight line that first requires that the equation of a line, y=mx+b, be solved and applied pixel-by-pixel. This approach, while simple, is computationally intensive and requires the use of real-number arithmetic for each pixel thus computed. Bresenham's algorithm is the usual technique for drawing a straight, solid line. Integer arithmetic is used to quickly calculate the individual pixels to be turned on. By carrying an error term, the average slope of the line is followed exactly, without having to perform multiplication at each pixel.

While the rendering of straight, solid lines is well established in the art, the drawing of patterned or stippled lines is of more concern. Certain computer software applications do not support the representation or drawing of stippled or patterned lines, so that patterned lines cannot be easily viewed through a standard viewing mechanism such as a monitor or other on-screen viewing device. Sun Microsystem's Java 1.1, a programming language used by many applications, for instance, does not support the drawing of patterned lines. There is no mechanism currently available through the Java 1.1 language interface that is capable of rendering patterned lines. Patterned or stippled lines as used herein refer to non-solid lines in which some type of pattern, such as dots, dashes, etc., is apparent. The term "pattern" generally refers to an array containing run-length encoding made up of "on" and "off" segments; the term "pattern repeat length" refers to the sum of the pattern's segment lengths. Thus a pattern of {3, 2, 1, 2}, has four pattern segments: a first, "on" segment with a length of three pixels, a second, "off" segment with a length of two pixels, a third, "on" segment with a length of one pixel, and a fourth, "off" segment with a length of two pixels. The pattern repeat length of this pattern is the sum of the segment lengths, or 8 pixels. A pattern is typically drawn over and over until the entire length of the patterned line is exhausted. An empty pattern ({ }) is equivalent to a single "on" segment of infinite length.

A patterned line is typically represented by rendering the segments of the line. The so-called "line-segment" solution calculates the extents of each line segment of a patterned line using the original endpoints of the line and employs a substantial amount of floating-point calculations to determine segment endpoints of the line. While workable, the line-segment solution results in an inaccurate representation of the line due to round-off error typically introduced during the floating-point calculations. Pixels drawn using the line-segment approach are not guaranteed to fall on the original primitive rendering of a line; the question becomes how to treat pixels that do not fall squarely on the line. This problem is not encountered when patterned lines are drawn according to the Bresenham line draw algorithm in which the particular pixels or dots between the two endpoints that will be drawn is determined. While solid lines with their integer coordinates are readily rendered in this manner, the primitive line-drawing method of the Bresenham algorithm cannot be easily used to render the fractional coordinates commonly associated with the segments of a patterned line.

Consider, for example, that a line from Cartesian coordinates [0, 0] to [9, 3] is to be rendered. [0, 0] refers to the beginning endpoint of the line, generally the leftmost endpoint. [9, 3] refers to the ending endpoint, generally the rightmost endpoint of the line. Diagram 1 illustrates the results of applying a typical line-drawing primitive to render a Cartesian coordinate representation of this line in a graphical display area, with each "#" representing a pixel that is rendered as "on."

```
              Diagram 1

3 |                  # #
      2 |              # # #
      1 |       # # #
      0 | # #
         ----------------------
          0       5       9
```

Now suppose that a pattern which has an initial segment of length 5 is to be imposed on the line. The coordinates of the endpoint of the initial segment would be, in real number coordinates, [4.74,1.58]. The endpoints, however, must be specified in integer coordinates. There are two methods available for converting real numbers into integer values-ignoring the fractional components ("truncation") or picking the "nearest" integer value ("rounding"). For example, if one were to convert the real numbers to integers by ignoring the fractional components, the endpoint for the end of the initial segment would be chosen as [4,1]. Diagram 2 depicts a typical rendering of the line segment from [0,0] to [4,1]:

```
              Diagram 2

2 |
      1 |       # # #
      0 | # #
         ----------------------
          0       5       9
```

This method correctly chooses pixels that originally appeared on the line. However, the pixel [4,1] is turned "on"

even though it only partially lies within the 5-unit pattern segment; adherence to the specified pattern is not maintained.

An alternate approach to coordinate conversion is to round up or round down a real number depending upon the value of the fractional remainder of the number, as measured in tenths. Thus, a number having a fractional remainder of greater than 0.5 would be rounded up to the next integer number while a number having a fractional remainder of equal to or less than 0.5 would be rounded down. If this standard rounding technique were applied in the example, the resulting endpoint would be [5,2]. Diagram 3 depicts a typical rendering of the line segment from [0,0] to [5,2]:

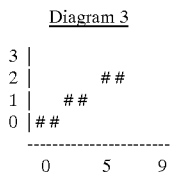

Notice that applying this technique caused the pixels at [4,2] and [5,2] to be turned on. Neither of these pixels were in the original line rendering, so some coherence with the original line rendering has been lost.

From an efficiency standpoint, the line-segment solution is very costly in that it calls the primitive line-drawing method for each segment of a patterned line. Since a pattern can have segments as small as one pixel, such calls of the primitive line-drawing method can fail to render certain portions of a line if the calculations end up with identical endpoints (beginning and ending) due to mathematical round-off. This results from the fact that the implementation of some primitive line-drawing methods render zero-length lines as a single pixel, others do not render them at all. This possibility is illustrated by the following example in which a line is drawn from [0,0] to [5,5] with an initial pattern segment of length 1. The endpoint of the first segment would be (in real number coordinates) [0.707,0.707]. If integer conversion is the technique applied to derive the endpoint, the result is [0,0], the same as the beginning point of the line. Standard rounding techniques may avoid this situation, although may have other deficiencies as previously described.

SUMMARY OF THE INVENTION

Therefore, according to the present invention, a method of rendering patterned lines in a processing environment that supports the rendering of graphical primitives in an off-screen imaging area is disclosed. An off-screen imaging area, such as a partition of a memory of the processing environment that is capable of rendering graphics primitives without displaying them on a viewable device, is created. The off-screen imaging area is representative of an on-screen graphics area of a viewable device having a plurality of pixels and is empty when initially created. The size of the off-screen imaging area in the memory is defined by a bounding rectangle of the patterned line to be rendered. The off-screen imaging area is next filled with a suitable, distinct background color that is representative of pixels being "off." A solid line is then rendered within the off-screen imaging area from beginning endpoint to ending endpoint of the patterned line to be drawn by changing the color of the pixels that fall on the line from the background color to another line color. A pattern, having contiguous on- and off-segments and a repeat length, is next applied to the solid line by means of a filtering mechanism whereby pixels that correspond to off-segments of the pattern are filtered out. The resulting patterned line is transferred from the off-screen imaging area to a viewable device wherein it can be rendered on the on-screen graphics area of the viewable device and thus viewed. The above is performed for each patterned line to be rendered. The methodology of the present invention may be implemented by a computer program of a computer-readable medium.

The filtering that occurs when the pattern is applied to the solid line is practiced for each of the pixels. The color of the pixel must be determined. If the pixel is the line color and thus "on," the distance of the pixel from the beginning endpoint of the solid line is calculated. A remainder distance of the quotient obtained by dividing the distance of the pixel from the beginning endpoint by the pattern repeat length of the pattern is next calculated. If the remainder distance falls entirely within an on-segment, the line color of the pixel is maintained as the line color. If, however, the remainder distance falls entirely within an off-segment of the pattern, the pixel is turned "off" by changing its color from the line color to the background color. If the remainder distance does not fall entirely within an on-segment or an off-segment, this is indicative of the pixel spanning two contiguous segments of the pattern, an on-segment and an off-segment. In this event, anti-aliasing may be used in the filtering procedure. If anti-aliasing is to be used, the intensity of the pixel is set by applying anti-aliasing to the pixel in accordance with the percentage of the pixel that falls within each of the contiguous on- and off-segments. If anti-aliasing is not to be used, the pixel is turned off if it is found to lie predominately within the off-segment of the contiguous segments of the pattern.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

Figure 1:
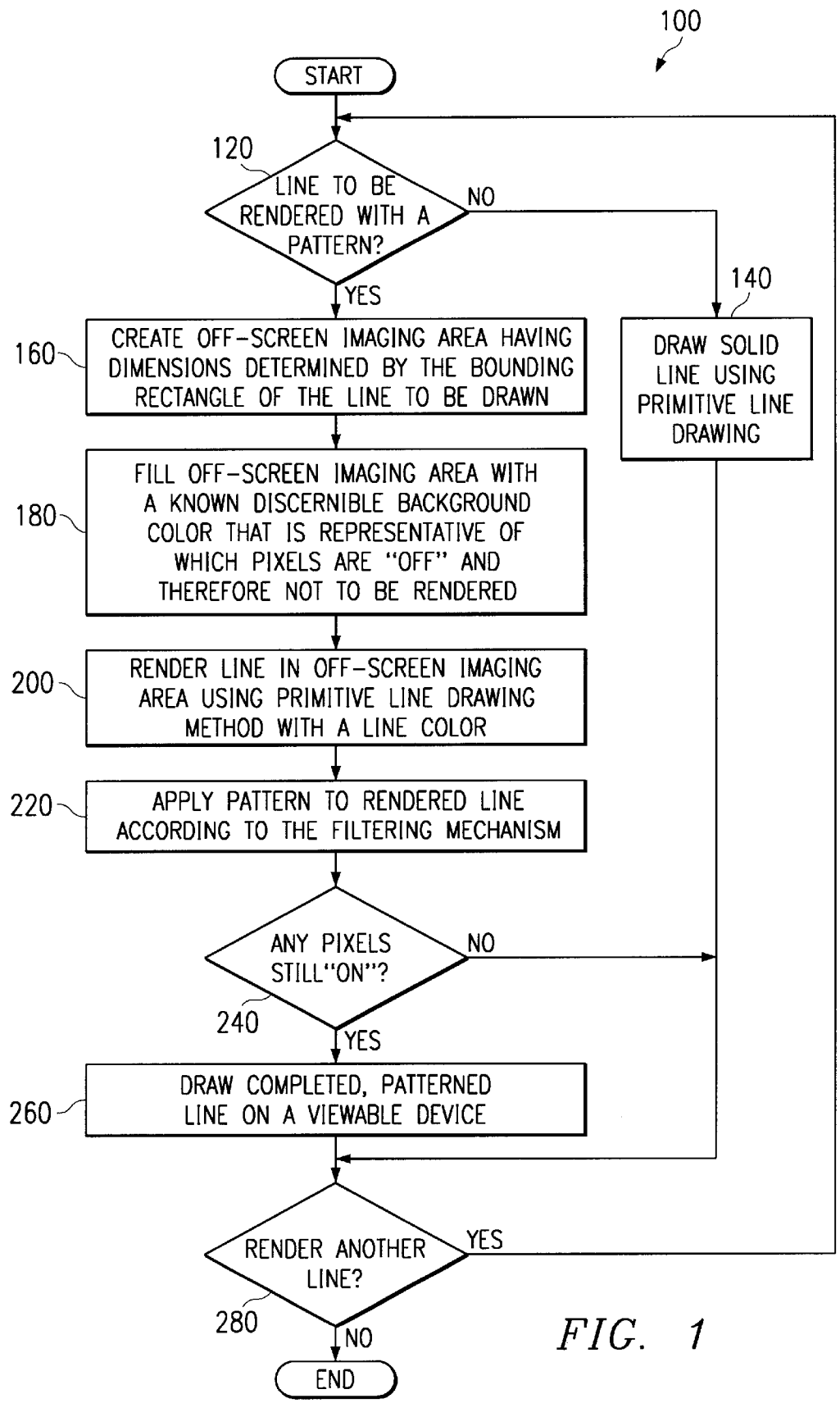
FIG. 1 is a flowchart that illustrates the methodology for rendering patterned lines in a processing environment that has a processor capable of running graphical application software, in accordance with the present invention.

While the invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawing.

Referring now to FIG. 1, flowchart 100 illustrates the methodology of the present invention for rendering patterned lines in a processing environment that has a processor capable of running graphical application software that supports the rendering of graphical primitives in an off-screen imaging area. At Decision Block 120, the inquiry is whether the line to be rendered is a patterned line. If it is not a patterned line, the line is solid and can be drawn using primitive line drawing methods known in the art at Block 140. If the line to be drawn is patterned, then at Block 160 an off-screen imaging area in the memory of the processing environment is created. The off-screen imaging area is representative of an on-screen graphics area having a number of pixels into which the pattern line will be displayed for viewing and will initially be empty (the pixel being devoid of color, or turned "off"). The off-screen imaging area may be a partition in memory of the processing environment, such as a partition of a video memory, for instance, and its size is defined by a bounding rectangle of the patterned line to be drawn.

At Block 180 the off-screen imaging area is filled with a background color, such as blue, so that every pixel within the area is indicated as being "off" initially. Next, at Block 200, a solid line, defined by the beginning and ending endpoints of the patterned lined to be rendered, is rendered within the off-screen imaging area in a line color, such as green, that is different and distinct from the background color. The solid line may be rendered using a primitive line drawing method; every pixel within the off-screen imaging area that falls along the line is changed from the background color to the line color. As previously explained, various methods may be employed to render the solid line in the line color.

The next step at Block 220 is to apply the desired pattern to the rendered solid line in accordance with a filtering mechanism to render the patterned line within the off-screen imaging area. The pattern is defined by one or more on-segments and one or more off-segments and has a pattern repeat length; on-segments are contiguous with off-segments of the pattern. The filtering mechanism is described further in conjunction with FIG. 2. Decision Block 240 determines whether there are any pixels still on. If so, then the flow continues to Block 260; otherwise, the flow skips to Decision Block 280. At Block 260, the information about the patterned line contained within the off-screen imaging area, or memory, is transferred from the off-screen imaging area to a viewable device, such as a monitor, where it is drawn on the viewable device for display. This may involve transferring the off-screen imaging area information from the partition of memory of the processing environment to a partition of memory of the viewing device. Decision Block 280 ensures that the method of flow 100 is repeated for every line to be rendered within the processing environment.

Figure 2:
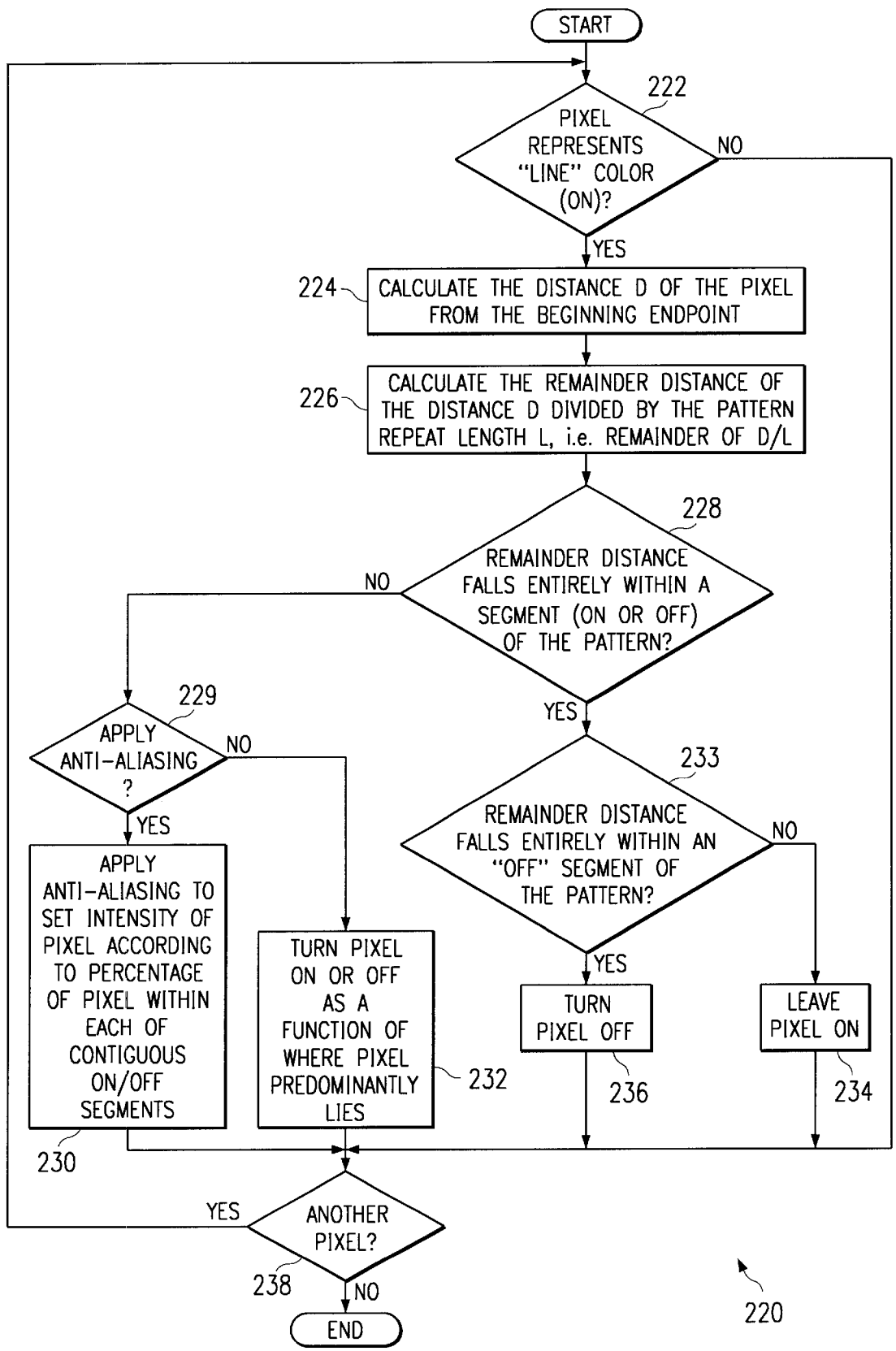
FIG. 2 is a flowchart that illustrates the filtering mechanism used to apply a pattern to the solid line to render a patterned line, in accordance with the present invention.

The flowchart of FIG. 2 illustrates the filtering mechanism used by the invention to apply the pattern to the solid line to render a patterned line. At Decision Block 222, the inquiry is whether a given pixel of the off-screen imaging area is the line color and therefore "on." If the pixel is not on the line, it is a blue background pixel that is off and Decision Block 238 ensures that the flow returns to 222 for every pixel of the off-screen imaging area. If, however, the pixel is on the line at Block 224 the distance of the pixel from the beginning endpoint is calculated. At Block 226, the remainder distance yielded by dividing the distance of the pixel calculated at Block 224 by the pattern repeat length is calculated. Next, at Decision Block 228, it is necessary to determine whether the remainder distance calculated at Block 226 falls entirely within a segment, either an on-segment or an off-segment, of the pattern. If so, this is indicative that the pixel can either be left on or turned off in the rendering of the patterned line. If the remainder distance falls entirely within an on-segment of the pattern, the pixel should be on within the pattern and is thus allowed to remain on as the line color. If, however, the remainder distance falls entirely within an off-segment of the pattern, the pixel must be turned "off" by changing its color from the line color to the background color.

Returning again to Decision Block 228, if the remainder distance does not fall entirely within an on-segment or an off-segment of the pattern, this is indicative of this particular pixel spanning two contiguous on- and off-segments of the pattern. At Decision Block 229, it must be decided whether an anti-aliasing technique is to be used to control the intensity of the pixel. If anti-aliasing is to be used, the intensity of the pixel is set by applying anti-aliasing to the pixel in accordance with what percentage of the pixel falls within an on-segment and which percentage falls within an off-segment of the pattern at Block 230. Anti-aliasing will be illustrated further in the examples to follow. If anti-aliasing is not to be used, the pixel is simply turned on or off as a function of where it predominately lies. If most (greater than 50%) of the pixel lies within the on-segment of two contiguous segments, then the pixel should be "on" as part of the patterned line and is allowed to remain the line color. If, however, more than 50% of the pixel lies within the off-segment of the contiguous segments, than the pixel needs to be "off" in the patterned line and so its color must change from the line color to the background color. Block 232 is further illustrated by the examples that follow. Decision Block 238 ensures that every pixel touching and concerning the solid line rendered at Block 200 of FIG. 1 goes through the method of FIG. 2.

The methodology described above is discussed in terms of manipulating pixel color and intensity within the off-screen imaging area. As stated previously, the off-screen imaging area may be thought of as an area of memory that is capable of rendering graphics primitives without displaying them on a viewable device.

The following examples will illustrate application of the present invention. Diagram 4 shows a typical rendering of a line drawn from [0,0] to [10,10]:

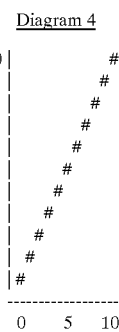

Diagram 4

Table 1 below illustrates the application of the algorithm with the pattern {3,3} to the pixels contained within the line drawn in Diagram 4, without anti-aliasing. Pixel intensity is described as a percentage between no intensity (fully "off") and full intensity (fully "on"). Thus, 0% represents "off", while 100% represents "on".

TABLE 1

| Coordinates | Pixel Intensity (%) |
|---|---|
| [0, 0] | 100 |
| [1, 1] | 100 |

TABLE 1-continued

| Coordinates | Pixel Intensity (%) |
|---|---|
| [2, 2] | 100 |
| [3, 3] | 0 |
| [4, 4] | 0 |
| [5, 5] | 100 |
| [6, 6] | 100 |
| [7, 7] | 0 |
| [8, 8] | 0 |
| [9, 9] | 100 |
| [10, 10] | 100 |

Diagram 5 below illustrates the data contained in Table 1. "#" represents a pixel with an intensity of 100% (fully "on"), while pixels with intensities of 0% (fully "off") are represented by empty space.

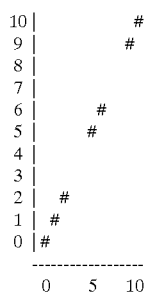

Diagram 5

Table 2 below illustrates the application of the algorithm with the pattern {3,3} to the pixels in Diagram 5, using anti-aliasing. Intensity is described as a percentage between no intensity and full intensity. 0 represents "off", while 100 represents "on".

TABLE 2

| Coordinates | Anti-aliased Pixel Intensity (%) |
|---|---|
| [0, 0] | 100 |
| [1, 1] | 100 |
| [2, 2] | 55 |
| [3, 3] | 0 |
| [4, 4] | 19 |
| [5, 5] | 100 |
| [6, 6] | 90 |
| [7, 7] | 0 |
| [8, 8] | 6 |
| [9, 9] | 100 |
| [10, 10] | 96 |

Diagram 6 illustrates the data contained in Table 2. "#" represents a pixel with an intensity of 100% ("on"), while "*" represents a pixel whose intensity is somewhere between 50% and 100% and "." represents a pixel whose intensity is somewhere between 0% and 50%. Pixels with intensities of 0% ("off") are represented by empty space.

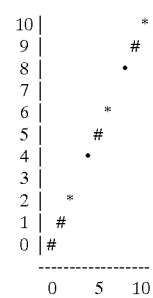

Diagram 6

It can be seen that the patterned line rendered using the anti-aliasing filtering technique in Diagram 6 is much more exact than the line rendered in Diagram 5 with anti-aliasing.

Since the present invention utilizes the filtering mechanism described above, it has the advantage of only representing pixels which would have been rendered using the conventional primitive line-drawing method of drawing patterned lines. This allows complete coherence with the original rendering to be maintained and further allows the patterned line to be used wherever a "solid" line would have been drawn without introducing any graphical anomalies. Such coherency is important for reproducibility. The present invention accounts for pixels which may lie on the boundary of two, contiguous pattern segments through the use of anti-aliasing. The possibility of missing short segments is still possible with this method, and can occur whenever the pattern contains segments of length 1 and the line being rendered is neither vertical nor horizontal. They are more likely to occur with lines whose angle of declination is +/−45 degrees. For patterns of longer segments, particularly long, complex patterns, however, the present invention works very well.

The present invention can be used in any computer software environment that is capable of rendering line graphical primitives in an off-screen imaging area. It is particularly useful in applications that do not support the rendering of lines directly through a standard viewing mechanism but that do support the rendering of graphical primitives in an off-screen imaging area. Sun Microsystem's Java 1.1 programming language, for instance, does not render patterned lines but it does support the rendering of graphical primitives in an off-screen imaging area, and thus Java applications can readily benefit from the present invention. Other applications, in addition to Java applications, that support the drawing of graphical primitives in an off-screen imaging area can likewise benefit from the present invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method of rendering patterned lines in a processing environment that supports the rendering of graphical primitives in an off-screen imaging area, comprising for each patterned line to be rendered:

creating the off-screen imaging area in a memory of the processing environment, the off-screen imaging area representative of an on-screen graphics area of a viewable device having a plurality of pixels;

filling the off-screen imaging area with a background color that is representative of the plurality of pixels of the on-screen graphics area being "off";

rendering a solid line within the off-screen imaging area in a line color different from the background color that is representative of pixels of the solid line within the on-screen graphics area being "off", wherein the solid line has a beginning endpoint and an ending endpoint;

applying a pattern to the solid line, by filtering out pixels that correspond to off-segments of the patterns and are not to be rendered, to render the patterned line in the off-screen imaging area of memory, wherein the pattern comprises one or more on-segments and one or more off-segments and has a pattern repeat length; and transferring the patterned line rendered in the off-screen imaging area to the viewable device where the patterned line is displayed.

2. The method of claim 1, wherein the size of the off-screen imaging area in the memory is defined by a bounding rectangle of the patterned line to be rendered.

3. The method of claim 1, wherein the off-screen imaging area is a partition of memory of the processing environment.

4. The method of claim 3, wherein the partition of memory is a partition of video memory.

5. The method of claim 1, wherein the solid line is rendered using a primitive line drawing method.

6. The method of claim 1, wherein filtering comprises for each pixel of the plurality of pixels represented by the off-screen imaging area:

determining whether the pixel is the line color;

if the pixel is the line color and on, further comprising:

calculating a distance of the pixel from the beginning endpoint of the solid line;

calculating a remainder distance of the distance of the pixel from the beginning endpoint divided by the pattern repeat length of the pattern;

determining whether the remainder distance falls entirely within an on-segment of the one or more on-segments or within an off-segment of the one or more off-segments of the pattern;

if the remainder distance falls entirely within an on-segment of the one or more on-segments or within an off-segment of the one or more off-segments of the pattern, further comprising:

if the remainder distance falls entirely within an on-segment of the one or more on-segments, maintaining the line color of the pixel; and if the remainder distance falls entirely within an off-segment of the one or more off-segments of the pattern, turning the pixel off by changing the line color of the pixel to the background color;

if the remainder distance does not fall entirely within an on-segment of the one or more on-segments or within an off-segment of the one or more off-segments of the pattern, indicative of the pixel spanning contiguous on- and off-segments of the pattern, further comprising:

if anti-aliasing is to be used, setting the intensity of the pixel by applying anti-aliasing to the pixel; and if anti-aliasing is not to be used, turning off the pixel as a function of whether the pixel lies predominately in the off-segment or on-segment of the contiguous on- and off-segments of the pattern.

7. The method of claim 6, wherein the intensity of the pixel is set in accordance with what percentage of the pixel falls within the contiguous on- and off-segments of the pattern.

8. The method of claim 1, wherein the off-screen imaging area information is transferred to a partition of memory of the viewing device from which the patterned line is rendered on the viewing device.

9. A computer-readable medium having a computer program for rendering patterned lines in a processing environment that supports the rendering of graphical primitives in an off-screen imaging area, comprising:

instructions for creating the off-screen imaging area in a memory of the processing environment, the off-screen imaging area representative of an on-screen graphics area of a viewable device having a plurality of pixels;

instructions for filling the off-screen imaging area with a background color that is representative of the plurality of pixels of the on-screen graphics area being "off";

instructions for rendering a solid line within the off-screen imaging area in a line color different from the background color that is representative of pixels of the solid line within the on-screen graphics area being "off", wherein the solid line has a beginning endpoint and an ending endpoint;

instructions for applying a pattern to the solid line, by filtering out pixels that correspond to off-segments of the patterns and are not to be rendered, to render the patterned line in the off-screen imaging area of memory, wherein the pattern comprises one or more on-segments and one or more off-segments and has a pattern repeat length; and instructions for transferring the patterned line rendered in the off-screen imaging area to the viewable device where the patterned line is displayed.

10. The medium of claim 9, wherein the size of the off-screen imaging area in the memory is defined by a bounding rectangle of the patterned line to be rendered.

11. The medium of claim 9, wherein the off-screen imaging area is a partition of memory of the processing environment.

12. The medium of claim 11, wherein the partition of memory is a partition of video memory.

13. The medium of claim 9, wherein the instructions for rendering the solid line encompass a primitive line drawing method.

14. The medium of claim 9, wherein instructions for filtering comprises for each pixel of the plurality of pixels represented by the off-screen imaging area:

instructions for determining whether the pixel is the line color;

if the pixel is the line color and on, further comprising:

instructions for calculating a distance of the pixel from the beginning endpoint of the solid line;

instructions for calculating a remainder distance of the distance of the pixel from the beginning endpoint divided by the pattern repeat length of the pattern;

instructions for determining whether the remainder distance falls entirely within an on-segment of the one or more on-segments or within an off-segment of the one or more off-segments of the pattern;

if the remainder distance falls entirely within an on-segment of the one or more on-segments or within an off-segment of the one or more off-segments of the pattern, further comprising:

if the remainder distance falls entirely within an on-segment of the one or more on-segments, instructions for maintaining the line color of the pixel; and if the remainder distance falls entirely within an off-segment of the one or more off-segments of the pattern, instructions for turning the pixel off by changing the line color of the pixel to the background color;

if the remainder distance does not fall entirely within an on-segment of the one or more on-segments or within an off-segment of the one or more off-segments of the pattern, indicative of the pixel spanning contiguous on- and off-segments of the pattern, further comprising:

if anti-aliasing is to be used, instructions for setting the intensity of the pixel by applying anti-aliasing to the pixel; and if anti-aliasing is not to be used, instructions for turning off the pixel as a function of whether the pixel lies predominately in the off-segment or on-segment of the contiguous on- and off-segments of the pattern.

15. The medium of claim 14, wherein the intensity of the pixel is set in accordance with what percentage of the pixel falls within the contiguous on- and off-segments of the pattern.

16. The medium of claim 14, wherein the off-screen imaging area information is transferred to a partition of memory of the viewing device from which the patterned line is rendered on the viewing device.

* * * * *